United States Patent
Nabata et al.

(10) Patent No.: US 9,191,748 B2
(45) Date of Patent: *Nov. 17, 2015

(54) ELECTRONIC DEVICE

(71) Applicant: KYOCERA CORPORATION, Kyoto-shi Kyoto (JP)

(72) Inventors: Toshihisa Nabata, Sagamihara (JP); Satoshi Mizuta, Sagamihara (JP); Tomoaki Miyano, Kameyama (JP); Kiyokazu Sato, Yokohama (JP); Akio Kihara, Kawasaki (JP); Shun Kazama, Yokohama (JP); Yasuhiro Katayama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/002,699

(22) PCT Filed: Apr. 26, 2013

(86) PCT No.: PCT/JP2013/002874
§ 371 (c)(1),
(2) Date: Aug. 30, 2013

(87) PCT Pub. No.: WO2013/161326
PCT Pub. Date: Oct. 31, 2013

(65) Prior Publication Data
US 2014/0355792 A1 Dec. 4, 2014

(30) Foreign Application Priority Data
Apr. 26, 2012 (JP) ................................. 2012-101166

(51) Int. Cl.
*H04R 17/00* (2006.01)
*H04M 1/03* (2006.01)
(Continued)

(52) U.S. Cl.
CPC ............... *H04R 17/00* (2013.01); *H04M 1/035* (2013.01); *H04R 1/00* (2013.01); *H04R 7/045* (2013.01);
(Continued)

(58) Field of Classification Search
CPC .... H04R 2499/15; H04R 7/045; H04R 17/00; H04R 2440/05; H04R 2499/11
USPC ................................... 381/162, 151
See application file for complete search history.

(56) References Cited

U.S. PATENT DOCUMENTS 3,728,741 A * 4/1973 Lepor ............................. 2/209
6,259,188 B1   7/2001 Woodard et al.
(Continued)

FOREIGN PATENT DOCUMENTS

EP   1542064 A1   6/2005
EP   2793483 A1   10/2014
(Continued)

OTHER PUBLICATIONS

International Search Report; PCT/JP2013/002874 issued on Jun. 11, 2013.
(Continued)

*Primary Examiner* — Duc Nguyen
*Assistant Examiner* — George Monikang
(74) *Attorney, Agent, or Firm* — Studebaker & Brackett PC

(57) ABSTRACT

Provided is an electronic device including a housing and an acoustic device configured to generate vibration sound that is transmitted through vibration of a part of a human body. The acoustic device includes a panel configured to be joined to the housing; a piezoelectric element configured to be joined to the panel for vibrating the panel; and a vibration adjusting unit configured to be joined to the panel and vibrated together with the panel by the piezoelectric element. With the above configuration, a frequency characteristic is improved.

23 Claims, 8 Drawing Sheets

(51) Int. Cl.
*H04R 7/04* (2006.01)
*H04R 1/00* (2006.01)
*H04R 31/00* (2006.01)
*H04R 17/10* (2006.01)

(52) U.S. Cl.
CPC ............... *H04R 17/10* (2013.01); *H04R 31/003* (2013.01); *H04R 2440/05* (2013.01); *H04R 2499/11* (2013.01); *H04R 2499/15* (2013.01)

(56) References Cited

U.S. PATENT DOCUMENTS

| | | | |
|---|---|---|---|
| 6,427,017 | B1 | 7/2002 | Toki |
| 7,050,600 | B2 | 5/2006 | Saiki et al. |
| 7,174,025 | B2 | 2/2007 | Azima et al. |
| 7,421,088 | B2 | 9/2008 | Cranfill et al. |
| 7,512,425 | B2 | 3/2009 | Fukuda |
| 7,657,042 | B2 | 2/2010 | Miyata |
| 8,199,959 | B2 | 6/2012 | Miyata |
| 8,200,289 | B2 | 6/2012 | Joo et al. |
| 8,279,623 | B2 | 10/2012 | Idzik et al. |
| 8,848,967 | B2 | 9/2014 | Joo |
| 2001/0026625 | A1 | 10/2001 | Azima et al. |
| 2002/0065113 | A1 | 5/2002 | Mori |
| 2002/0067841 | A1* | 6/2002 | Bank et al. ............... 381/152 |
| 2002/0076061 | A1* | 6/2002 | Ashtiani et al. .......... 381/86 |
| 2004/0109571 | A1 | 6/2004 | Yoshimine |
| 2005/0002537 | A1 | 1/2005 | Azima et al. |
| 2005/0057527 | A1* | 3/2005 | Takenaka et al. ........ 345/173 |
| 2005/0129267 | A1 | 6/2005 | Azima et al. |
| 2005/0169112 | A1 | 8/2005 | Shimizu |
| 2006/0093165 | A1 | 5/2006 | Kamimura et al. |
| 2006/0140424 | A1* | 6/2006 | Kobayashi ............... 381/190 |
| 2006/0227981 | A1 | 10/2006 | Miyata |
| 2006/0286998 | A1 | 12/2006 | Fukuda |
| 2007/0057909 | A1 | 3/2007 | Schobben et al. |
| 2007/0097073 | A1 | 5/2007 | Takashima et al. |
| 2008/0268921 | A1 | 10/2008 | Taniguchi et al. |
| 2009/0103767 | A1 | 4/2009 | Kuroda et al. |
| 2009/0147969 | A1* | 6/2009 | Kinouchi et al. ......... 381/94.7 |
| 2009/0290746 | A1 | 11/2009 | Miyata |
| 2009/0296976 | A1* | 12/2009 | Tsai et al. ............... 381/386 |
| 2010/0225600 | A1 | 9/2010 | Dai et al. |
| 2010/0278362 | A1 | 11/2010 | Kim |
| 2011/0234459 | A1* | 9/2011 | Yabe ..................... 343/702 |
| 2012/0063074 | A1 | 3/2012 | Matsuda et al. |
| 2013/0051585 | A1 | 2/2013 | Karkkainen et al. |
| 2013/0308798 | A1 | 11/2013 | Lee |
| 2014/0342783 | A1 | 11/2014 | Suzuki et al. |
| 2015/0023531 | A1 | 1/2015 | Horii et al. |

FOREIGN PATENT DOCUMENTS

| | | | |
|---|---|---|---|
| JP | 62-086799 U | 6/1987 | |
| JP | H07-296786 A | 11/1995 | |
| JP | H08-223675 A | 8/1996 | |
| JP | 09-247795 A | 9/1997 | |
| JP | H11-25940 A | 1/1999 | |
| JP | 2001-007546 A | 1/2001 | |
| JP | 2002-027065 A | 1/2002 | |
| JP | 2002-185593 A | 6/2002 | |
| JP | 2002-219413 A | 8/2002 | |
| JP | 2002-232542 A | 8/2002 | |
| JP | 2002-305569 A | 10/2002 | |
| JP | 2004-187031 A | 7/2004 | |
| JP | 2005-214793 A | 8/2005 | |
| JP | 2005-236352 A | 9/2005 | |
| JP | 2005-284054 A | 10/2005 | |
| JP | 2005-348193 A | 12/2005 | |
| JP | 2007-502594 A | 2/2007 | |
| JP | 2007-082009 A | 3/2007 | |
| JP | 2007-180827 A | 7/2007 | |
| JP | 2007-189578 A | 7/2007 | |
| JP | 2008-017398 A | 1/2008 | |
| JP | 2008-270879 A | 11/2008 | |
| JP | 2009-118396 A | 5/2009 | |
| JP | 2011-091719 A | 5/2011 | |
| JP | 2013-110535 A | 6/2013 | |
| JP | 5255142 B1 | 8/2013 | |
| JP | 2013-207795 A | 10/2013 | |
| JP | 2013-207796 A | 10/2013 | |
| JP | 2013-223238 A | 10/2013 | |
| JP | 2013-232874 A | 11/2013 | |
| JP | 2013-255212 A | 12/2013 | |
| KR | 10-1068254 B1 | 9/2011 | |
| WO | 2004/023199 A1 | 3/2004 | |
| WO | 2004/051967 A1 | 6/2004 | |
| WO | 2006/059679 A1 | 6/2006 | |
| WO | 2006/114985 A1 | 11/2006 | |
| WO | 2012/025783 A1 | 3/2012 | |

OTHER PUBLICATIONS

Japanese Office Action; JP2012-148773; Jul. 31, 2012.
Japanese Office Action; JP2012-148773; Jan. 8, 2013.
An Office Action; "Notice of Reasons for Rejection," issued by the Japanese Patent Office on Dec. 2, 2014, which corresponds to Japanese Patent Application No. 2014-016082 and is related to U.S. Appl. Nos. 14/002,675 and 14/002,699; with English language concise explanation.
An Office Action; "Notice of Reasons for Rejection," issued by the Japanese Patent Office on Dec. 2, 2014, which corresponds to Japanese Patent Application No. 2014-016046 and is related to U.S. Appl. Nos. 14/002,698 and 14/002,699; with English language concise explanation.
An Office Action issued by the Japanese Patent Office on Aug. 28, 2012, which corresponds to Japanese Patent Application No. 2012-148834 and is related to U.S. Appl. Nos. 14/002,357 and 14/002,699.
An Office Action issued by the Japanese Patent Office on Feb. 5, 2013, which corresponds to Japanese Patent Application No. 2012-148834 and is related to U.S. Appl. Nos. 14/002,357 and 14/002,699.
An Office Action issued by the Japanese Patent Office on Apr. 23, 2013, which corresponds to Japanese Patent Application No. 2012-148834 and is related to U.S. Appl. Nos. 14/002,357 and 14/002,699.
An Office Action issued by the Japanese Patent Office on Aug. 26, 2014, which corresponds to Japanese Patent Application No. 2014-016081 and is related to U.S. Appl. Nos. 14/002,357 and 14/002,699.
An Office Action issued by the Japanese Patent Office on Aug. 26, 2014, which corresponds to Japanese Patent Application No. 2014-016048 and is related to U.S. Appl. Nos. 14/002,668 and 14/002,699.
An Office Action issued by the Japanese Patent Office on Jul. 31, 2012, which corresponds to Japanese Patent Application No. 2012-148844 and is related to U.S. Appl. Nos. 14/002,668 and 14/002,699.
An Office Action issued by the Japanese Patent Office on Jan. 8, 2013, which corresponds to Japanese Patent Application No. 2012-148844 and is related to U.S. Appl. Nos. 14/002,668 and 14/002,699.
An Office Action issued by the Japanese Patent Office on Jul. 31, 2012, which corresponds to Japanese Patent Application No. 2012-148798 and is related to U.S. Appl. Nos. 14/002,675 and 14/002,699.
An Office Action issued by the Japanese Patent Office on Jan. 8, 2013, which corresponds to Japanese Patent Application No. 2012-148798 and is related to U.S. Appl. Nos. 14/002,675 and 14/002,699.
An Office Action issued by the Japanese Patent Office on Apr. 23, 2013, which corresponds to Japanese Patent Application No. 2012-148798 and is related to U.S. Appl. Nos. 14/002,675 and 14/002,699.
An Office Action issued by the Japanese Patent Office on Jul. 31, 2012, which corresponds to Japanese Patent Application No. 2012-148809 and is related to U.S. Appl. Nos. 14/002,698 and 14/002,699.
An Office Action issued by the Japanese Patent Office on Jan. 8, 2013, which corresponds to Japanese Patent Application No. 2012-148809 and is related to U.S. Appl. Nos. 14/002,698 and 14/002,699.
International Search Report; PCT/JP2013/002789; issued on Jun. 11, 2013, which corresponds to U.S. Appl. Nos. 14/002,357 and 14/002,699.
International Search Report; PCT/JP2013/002088; issued on May 14, 2013, which corresponds to U.S. Appl. Nos. 14/002,668 and 14/002,699.

(56) References Cited

OTHER PUBLICATIONS

International Search Report; PCT/JP2013/002530; issued on May 14, 2013, which corresponds to U.S. Appl. Nos. 14/002,675 and 14/002,699.
International Search Report; PCT/JP2013/002138; issued on May 14, 2013, which corresponds to U.S. Appl. Nos. 14/002,698 and 14/002,699.
The extended European search report issued by the European Patent Office on Jul. 3, 2013, which corresponds to European Patent Application No. 13163442.0 and is related to U.S. Appl. Nos. 13/862,333 and 14/002,699.
An Office Action; "Notice of Reasons for Rejection," issued by the Japanese Patent Office on Feb. 10, 2015, which corresponds to Japanese Patent Application No. 2012-089203 and is related to U.S. Appl. Nos. 13/860,150 and 14/002,699; with English language concise explanation.
An Office Action; "Notice of Reasons for Rejection," issued by the Japanese Patent Office on Mar. 17, 2015, which corresponds to Japanese Patent Application No. 2014-016048 and is related to U.S. Appl. Nos. 14/002,668 and 14/002,699; with English language concise explanation.
An Office Action; "Notice of Reasons for Rejection," issued by the Japanese Patent Office on Mar. 24, 2015, which corresponds to Japanese Patent Application No. 2012-091021 and is related to U.S. Appl. Nos. 13/862,333 and 14/002,699; with English language concise explanation.
The extended European search report issued by the European Patent Office on Aug. 5, 2015, which corresponds to European Patent Application No. 13780570.1-1910 and is related to U.S. Appl. No. 14/002,699.
The extended European search report issued by the European Patent Office on Jul. 30, 2015, which corresponds to European Patent Application No. 13767862.9-1972 and is related to U.S. Appl. Nos. 14/807,865 and 14/002,699.

* cited by examiner

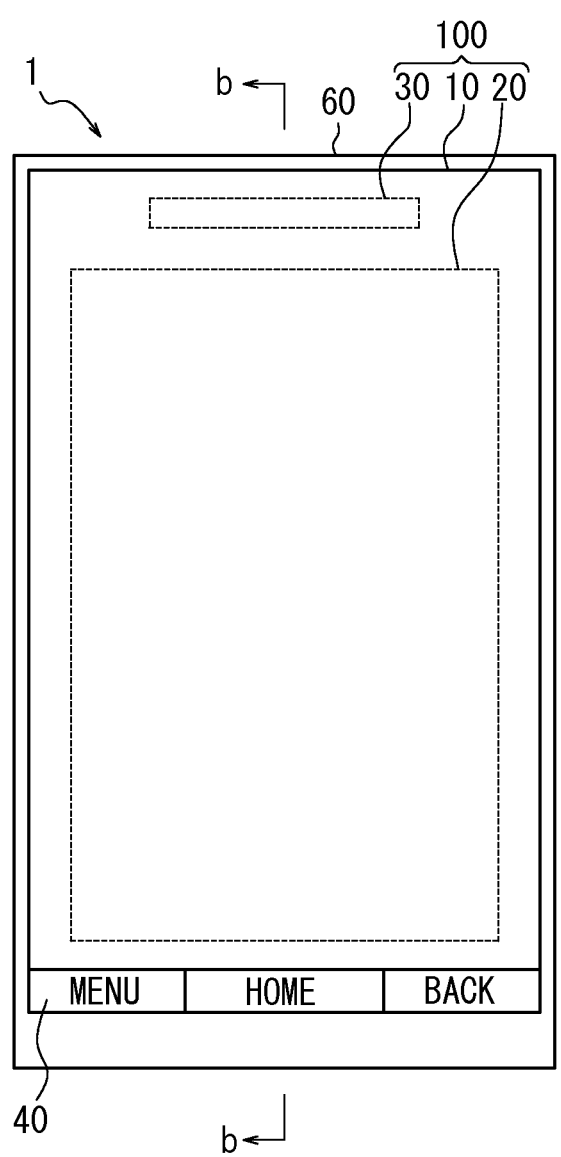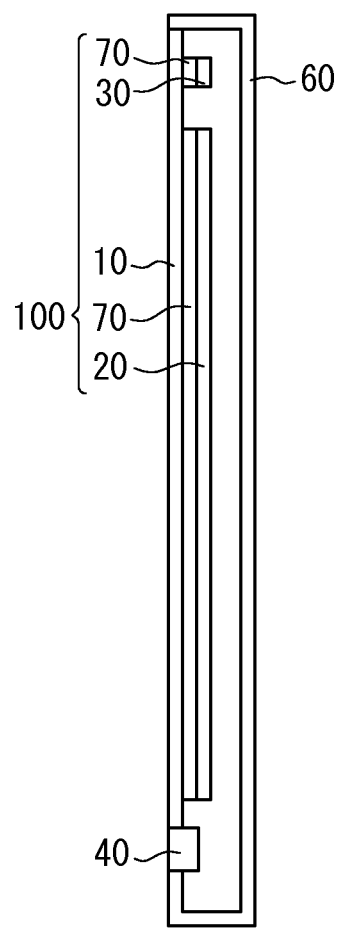

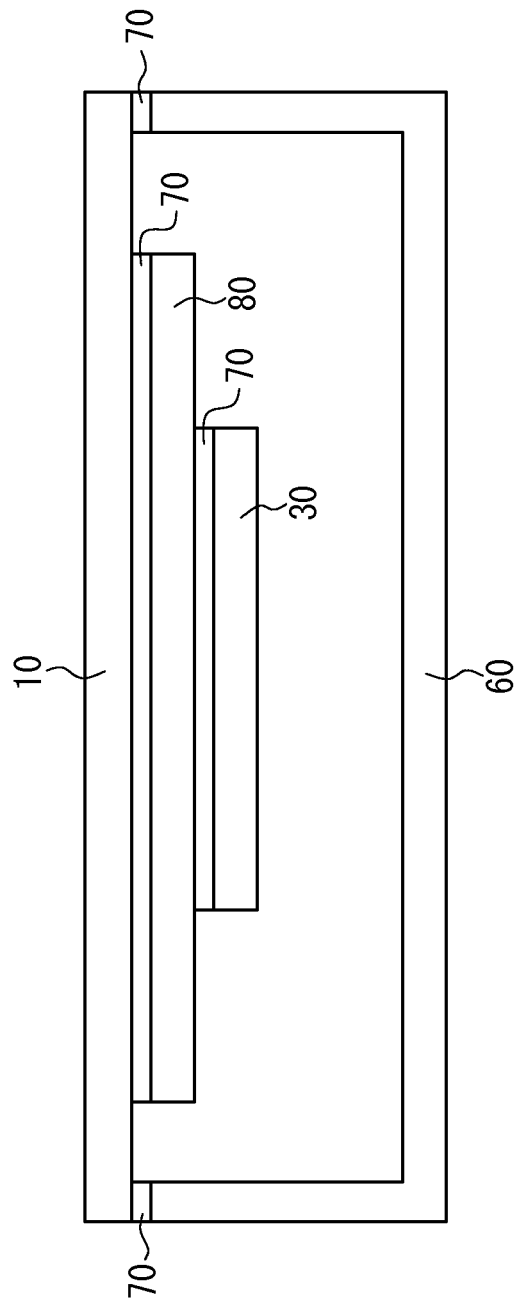

ELECTRONIC DEVICE

CROSS-REFERENCE TO RELATED APPLICATION

This application claims priority to and the benefit of Japanese Patent Application No. 2012-101166 filed on Apr. 26, 2012, the entire contents of which are incorporated herein by reference.

FIELD

The present invention relates to an electronic device that vibrates a panel by applying a predetermined electric signal (sound signal) to a piezoelectric element and that transfers the vibration of the panel to a human body to thereby transmit air-conduction sound and vibration sound to a user.

BACKGROUND

Patent Literature 1 listed below describes an electronic device such as a mobile phone that transmits air-conduction sound and bone-conduction sound to a user. Patent Literature 1 also describes that the air-conduction sound is sound perceived by an auditory nerve of a user as a result of an eardrum being vibrated by an air vibration that is created by a vibration of an object and that travels through an external auditory canal down to the eardrum. Furthermore, Patent Literature 1 describes that bone-conduction sound is transmitted to the auditory nerve of the user through a part of a user's body (e.g. a cartilaginous portion of an external ear) that is in contact with the vibrating object.

According to Patent Literature 1, in the described mobile phone, a rectangular plate-shaped vibration body configured by piezoelectric bimorph and a flexible material is attached to an outer surface of a housing via an elastic member. Patent Literature 1 also describes that, upon application of a voltage to the piezoelectric bimorph of the vibration body, the piezoelectric material is expanded and contracted in a longitudinal direction, thereby causing the vibration body to undergo flexture vibration. As a result, when the user places the vibration body in contact with an auricle, air-conduction sound and bone-conduction sound are transmitted to the user.

CITATION LIST

Patent Literature 1: Japanese Patent Application Publication No. 2005-348193

SUMMARY

In the electronic device described in Patent Literature 1, the vibration body is attached to the outer surface of the housing of the mobile phone or the like. Patent Literature 1 does not take into consideration a problem posed when the panel attached to the housing is vibrated.

The present invention is to provide an electronic device that may be preferably used for an electronic device of a type which vibrates the panel attached to the housing.

One aspect of the present invention resides in an electronic device including: a housing; and an acoustic device configured to generate vibration sound that is transmitted by vibrating a part of a human body. The acoustic device includes: a panel configured to be joined to the housing; a piezoelectric element configured to be joined to the panel for vibrating the panel; and a vibration adjusting unit configured to be joined to the panel and vibrated together with the panel by the piezoelectric element. The acoustic device has a resonance frequency within a predetermined frequency range.

The vibration adjusting unit may be a display unit configured to display predetermined information.

The panel may have a resonance frequency within a range outside the predetermined frequency range. Alternatively or additionally, the piezoelectric element may have a resonance frequency within a range outside the predetermined frequency range.

The electronic device may further include a voice communication function. The acoustic device may be configured to generate air-conduction sound and vibration sound that correspond to sound in voice communication, and the predetermined frequency range may be from 0.4 kHz to 3.4 kHz.

The electronic device may further include an amplifier configured to amplify a signal applied to the piezoelectric element.

A length of the panel in a direction extending from a joining portion of the piezoelectric element to a joining portion of the vibration adjusting unit is preferably greater than or equal to a length from an antitragus to an inferior crus of antihelix. Alternatively or additionally, a length of the panel in a direction intersecting the direction extending from the joining portion of the piezoelectric element to the joining portion of the vibration adjusting unit is preferably greater than or equal to a length from a tragus to an antihelix.

The piezoelectric element may be joined to the panel by a joining member. The joining member may be a non-thermosetting adhesive agent, or a double-sided adhesive tape.

The panel may be joined to the housing by a joining member. The joining member may be a non-thermosetting adhesive agent, or a double-sided adhesive tape.

The panel may form a part or an entirety of any of a display unit, an input unit, a cover of the display unit, and a lid portion that allows a rechargeable battery to be detachable.

According to the present invention, the electronic device of the type which vibrates the panel attached to the housing is appropriately used.

BRIEF DESCRIPTION OF DRAWINGS

The present invention will be further described below with reference to the accompanying drawings, wherein:

FIGS. 3A and 3B illustrate a housing structure of an electronic device according to another embodiment;

FIG. 8 illustrates one example of joining between a panel and a housing.

DESCRIPTION OF EMBODIMENTS

Figure 1:
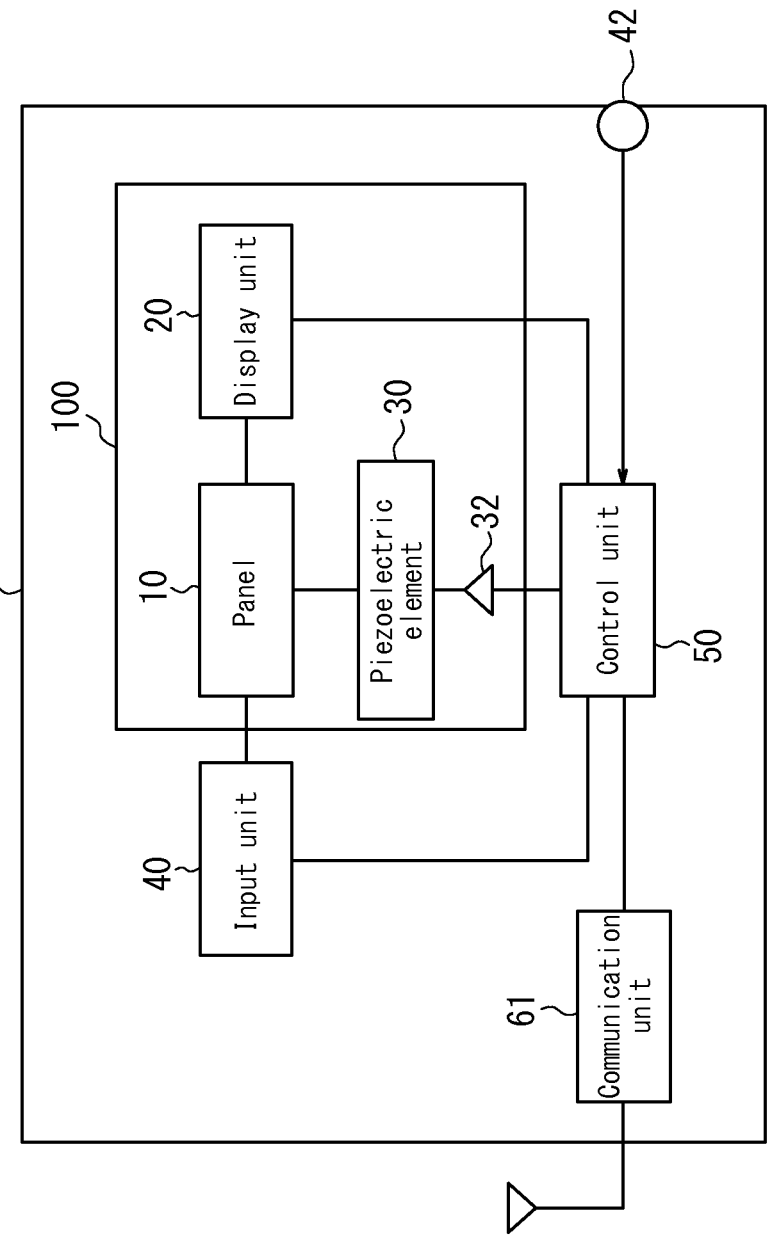
FIG. 1 is a function block diagram of an electronic device according to one embodiment of the present invention.

Embodiments of the present invention will be described with reference to the accompanying drawings. FIG. 1 is a function block diagram of an electronic device 1 according to one embodiment of the present invention. The electronic device 1, which is a mobile phone (smartphone), for example, includes an acoustic device 100 (which includes a panel 10, a display unit 20, and a piezoelectric element 30), an input unit 40, a communication unit 61, and a control unit 50. In the electronic device 1 as the mobile phone, the acoustic device 100 generates sound which is transmitted to an inner part of a human body by a vibration of the panel 10 generated by the piezoelectric element 30. The sound to be transmitted to an inner part of the human body passes through a soft tissue of the human body (e.g. a cartilage) to vibrate a middle ear or an inner ear.

The panel 10 may be a touch panel that is configured to detect a contact, a cover panel that protects the display unit 20, or the like. The panel 10 may be made of glass or a synthetic resin such as acryl. The panel 10 preferably has a plate shape. The panel 10 may be a flat plate or a curved panel having a gradually inclined surface. When the panel 10 is the touch panel, the panel 10 detects a contact made by a finger of a user, a pen, a stylus pen, or the like. The touch panel may detect a contact using any type, such as the capacitive type, the resistive film type, a surface acoustic wave type (or an ultrasonic type), an infrared type, an electromagnetic induction type, a load detection type, and the like.

The display unit 20 is a display device such as a liquid crystal display, an organic EL display, and an inorganic EL display. The display unit 20 is disposed on a back surface of the panel 10. The display unit 20 may be joined to the back surface of the panel 10 using a joining member (e.g. an adhesive agent). The joining member may be an elastic resin (e.g. an optical elastic resin) with a controlled refractive index for light transmitted therethrough. The display unit 20 displays various information through the joining member and the panel 10. Since the display unit 20 is joined to the back surface of the panel 10, a resonance frequency of the acoustic device 100 including the panel 10 and the display unit 20 differ from a resonance frequency of the panel 10. That is to say, the display unit 20 corresponds to a "vibration adjusting unit." The frequency characteristic of the acoustic device 100 is described later.

The piezoelectric element 30 is an element that is configured to undergo expansion and contraction or bending (flexure) in accordance with an electromechanical coupling factor of a constituent material in response to an electric signal (voltage) applied thereto. As a material of the element, ceramic and crystal are used, for example. The piezoelectric element 30 may be a unimorph, a bimorph, or a laminated piezoelectric element. The laminated piezoelectric element includes a laminated unimorph element in which layers (e.g. 16 or 24 layers) of unimorph are laminated or a laminated bimorph element in which layers (e.g. 16 or 24 layers) of bimorph are laminated. The laminated piezoelectric element is configured by a laminated structure of a plurality of dielectric layers made of PZT (lead zirconate titanate) and electrode layers each disposed between adjacent ones of the dielectric layers, for example. Unimorph undergoes expansion and contraction in response to an electric signal (voltage) applied thereto, and bimorph undergoes bending in response to an electric signal (voltage) applied thereto.

The piezoelectric element 30 is disposed on the back surface of the panel 10 (i.e. a surface of an inner side of the electronic device 1). The piezoelectric element 30 is attached to the panel 10 by a joining member (e.g. a double-sided adhesive tape). The piezoelectric element 30 may be attached to the panel 10 via an intermediate member (e.g. a metal plate). The piezoelectric element 30 is at a predetermined distance from a surface of an inner side of a housing 60 in a state where the piezoelectric element 30 is disposed on the back surface of the panel 10. Preferably, the piezoelectric element 30 remains at a predetermined distance from the surface of the inner side of the housing 60 even in a state where the piezoelectric element 30 undergoes expansion and contraction or flexure. That is to say, the distance between the piezoelectric element 30 and the surface of the inner side of the housing 60 is preferably greater than a maximum amount of deformation of the piezoelectric element 30.

The input unit 40 is configured to receive an operation input from the user and is configured by using an operation button (an operation key), for example. When the panel 10 is the touch panel, the panel 10 is also capable of receiving an operation input from the user by detecting a contact made by the user.

The control unit 50 is a processor configured to control the electronic device 1. The control unit 50 applies, to the piezoelectric element 30, a predetermined electric signal (voltage corresponding to a sound signal). As an example, the voltage that the control unit 50 applies to the piezoelectric element 30 may be ±15 V which is greater than ±5 V, that is, a voltage to be applied to a so-called panel speaker configured for sound conduction using not vibration sound but air-conduction sound. With the above configuration, even when the user forcefully presses the panel 10 against a user's body with force greater than or equal to 3 N (e.g. force ranging from 5 N to 10 N), the vibration of the panel 10 occurs. As a result, vibration sound which is transmitted through a part of the user's body is generated. Note that a level of the voltage to be applied is appropriately adjustable according to how tightly the panel 10 is fixed to the housing or a support member or according to a capability of the piezoelectric element 30. The signal applied to the piezoelectric element 30 may be amplified by an amplifier 32. When the control unit 50 applies an electric signal to the piezoelectric element 30, the piezoelectric element 30 undergoes expansion and contraction or flexure in a longitudinal direction. At this point, the panel 10 attached with the piezoelectric element 30 is deformed in conjunction with expansion and contraction or flexure of the piezoelectric element 30, thus resulting in the vibration of the panel 10. The panel 10 undergoes flexure in response to expansion and contraction or flexure of the piezoelectric element 30. The panel 10 is bent directly by the piezoelectric element 30. The state in which the "panel 10 is bent directly by the piezoelectric element" differs from a phenomenon in which the panel is deformed when a certain area of the panel is vibrated due to inertial force of a piezoelectric actuator including the piezoelectric element provided in a casing as adopted in an existing panel speaker. The state in which the "panel 10 is bent directly by the piezoelectric element" includes a state in which the panel is bent directly by expansion and contraction or bending (flexure) of the piezoelectric element via the joining member or via the joining member and a reinforcing member 80 which is later described. Thus, the panel 10 generates air-conduction sound, and the panel 10 also generates vibration sound that is transmitted through a part of the body when the user places the part of the body (e.g. the cartilaginous portion of the external ear) in contact with the panel 10. The control unit 50 may apply, for example, an electric signal corresponding to a sound signal representing voice of a party on the phone as received by the communication 61, so as to generate air-conduction sound and vibration sound that correspond to the sound signal. The sound signal may represent a phone melody, music including a tune, or the like. The sound signal according to the electric signal may be based on music data stored in an internal memory of the electronic device 1 or may be reproduced according to music data stored in an external server and the like via the network.

The communication unit 61 converts the sound signal collected by a microphone 42 into a baseband signal and transmits the baseband signal to an electronic device of the party on the phone. The communication unit 61 also receives a baseband signal from the electronic device of the party on the phone through wireless communication and extracts a sound signal. The control unit 50 caused the acoustic device 100 to output the extracted sound signal as air-conduction sound and vibration sound. The above operations of the communication unit 61, the control unit 50, and the acoustic device 100 correspond to a "communication function."

The vibration is caused in an area of the panel 10 where the piezoelectric element 30 is disposed and in other areas of the panel 10 that are away from the area where the piezoelectric element 30 is disposed. The panel 10 includes, in the areas vibrated, a plurality of portions that is configured to vibrate in a direction intersecting with a main surface of the panel 10, and in each of the plurality of portions, a value indicating an amplitude of the vibration transitions over time from plus to minus or vice versa. The panel 10 is vibrated such that areas with relatively large amplitude of vibration and areas with relatively small amplitude of vibration are seemingly distributed randomly or in a cyclic manner across a large area of the panel 10 at a certain moment. In other words, the vibration of a plurality of wavelengths may be detected across the large area (e.g. substantially all areas) of the panel 10. In order to prevent the aforementioned vibration of the panel 10 from being attenuated even when the user forcefully presses the panel 10 against the user's body with force ranging from 5 N to 10 N, for example, the voltage that the control unit 50 applies to the piezoelectric element 30 may be ±15 V. The above configuration allows the user to listen to sound while placing the ear in contact with the areas of the panel 10 that are away from the area where the piezoelectric element 30 is disposed.

Figure 2:
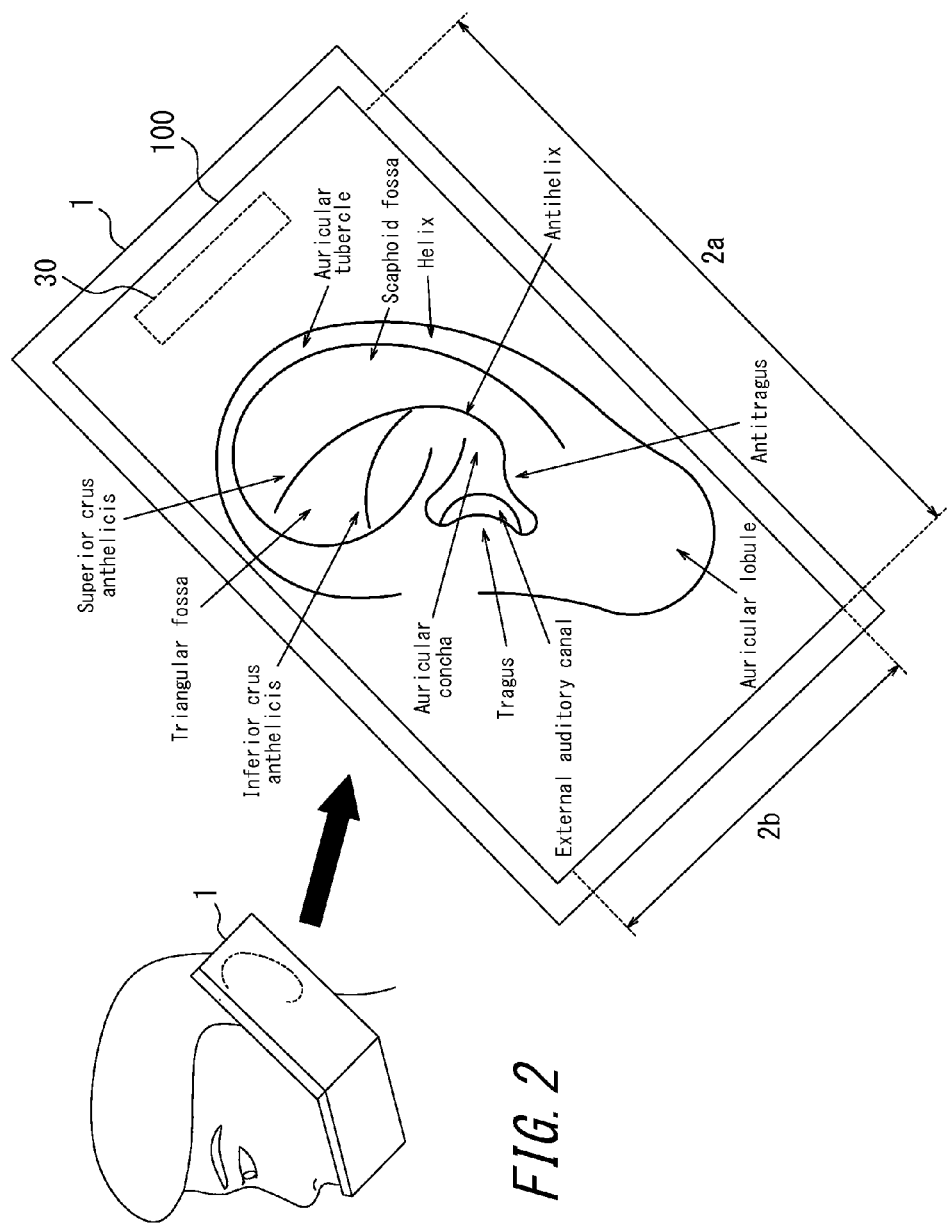
FIG. 2 illustrates a preferable shape of a panel.

It is to be noted that the panel 10 may be as large as the user's ear. As illustrated in FIG. 2, the panel 10 may also be larger than the user's ear. In this case, when the user listens to sound, the whole ear tends to be covered by the panel 10 of the electronic device 1. As a result, ambient sound (noise) is prevented from entering through the external auditory canal. It is suffice for the vibration to occur in an area of the panel 10 that is larger than an area having a length corresponding to a distance from an inferior crus of antihelix (i.e. an inferior crus anthelicis) to an antitragus and a width corresponding to a distance from a tragus to an antihelix. It is preferable for the vibration to occur in an area of the panel 10 that is larger than an area having a length corresponding to a distance from a portion of a helix that is near a superior crus of antihelix (i.e. a superior crus anthelicis) to an auricular lobule and a width corresponding to a distance from the tragus to a portion of the helix that is near the antihelix. A length direction herein refers to a longitudinal direction 2a along which the panel 10 extends, and the piezoelectric element 30 is disposed closer to one end relative to a middle of the panel 10 in the longitudinal direction 2a. A width direction refers to a direction 2b intersecting with the longitudinal direction.

The areas having the above lengths and widths may have a rectangular shape or an elliptical shape with as a major axis corresponding to the length and a minor axis corresponding to the width. Average ear size of the Japanese can be seen from the Japanese Body Dimension Database (1992-1994) or the like distributed by the Research Institute of Human Engineering for Quality Life (HQL). The panel 10 with a size greater than or equal to the average ear size of the Japanese would be generally capable of covering a whole ear of a foreigner as well. With the aforementioned dimension and shape, the panel 10 is capable of covering the user's ear, which offers tolerance to misalignment when the user presses the panel 10 to the ear.

The above electronic device 1 is capable of transmitting, to the user, air-conduction sound and vibration sound which is transmitted through a part of the user's body (e.g. the cartilaginous portion of the external ear), using the vibration of the panel 10. Accordingly, when the panel 10 outputs sound at substantially the same volume level as a dynamic receiver, less volume of sound propagates to an external environment of the electronic device 1 due to the vibration of air resulting from the vibration of the panel 10, compared to a case of the dynamic receiver. Accordingly, the electronic device 1 is well-suited for a situation where a recorded message is listened to on the train and the like, for example.

Furthermore, since the above electronic device 1 transmits vibration sound by the vibration of the panel 10, even when the user wears an earphone or a headphone, the user is able to listen to sound though the earphone or the headphone and a portion of the body by placing the electronic device 1 in contact with the earphone and the headphone.

The above electronic device 1 transmits sound to the user by the vibration of the panel 10. Accordingly, in a case where the electronic device 1 is not provided with an additional dynamic receiver, it is not necessary to provide the housing with an opening (i.e. a sound discharge opening) for sound transmission. As a result, the waterproof structure of the electronic device 1 is simplified. When the electronic device 1 is provided with a dynamic receiver, the sound discharge opening may be closed by a member that passes air through and blocks liquid. The member that passes air through and blocks liquid may be Gore-Tex™, for example.

<First Embodiment>

FIGS. 3A and 3B illustrate the housing structure of the electronic device 1 according to a first embodiment. FIG. 3A is a front view, and FIG. 3B is a sectional view taken along a line b-b of FIG. 3A. The electronic device 1 illustrated in FIGS. 3A and 3B is a smartphone in which the touch panel, i.e., a glass plate, is disposed on a front surface of a housing 60 (e.g. a metal or a resin casing). The panel 10 and the input unit 40 are supported by the housing 60. The panel 10 is joined to the housing 60 by the adhesive agent, the double-sided adhesive tape, or the like having thermosetting properties, ultraviolet-curable properties, and the like. The display unit 20 and the piezoelectric element 30 are each adhered to the panel 10 by a joining member 70. Note that the joining member 70 may be the adhesive agent, the double-sided adhesive tape, or the like having thermosetting properties, ultraviolet-curable properties, or the like. For example, the joining member 70 may be an optical elastic resin, which is a colorless and transparent ultraviolet-curable acrylic adhesive agent. The panel 10, the display unit 20, and the piezoelectric element 30 each have a substantially rectangular shape.

The display unit 20 is disposed in substantially a middle of the panel 10 in a short-side direction thereof. The piezoelectric element 30 is disposed near an end of the panel 10 in the longitudinal direction of the panel 10 at a predetermined distance from the end such that the longitudinal direction of the piezoelectric element 30 extends along a short side of the panel 10. The display unit 20 and the piezoelectric element 30 are disposed side by side in a direction parallel to a surface of an inner side of the panel 10.

In the electronic device 1 configured as above, the panel 10 is vibrated by the piezoelectric element 30, and the display unit 20 and the piezoelectric element 30 itself, which are joined to the panel 10 by the joining member 70, are vibrated. Thus, the panel 10, the display unit 20, and the piezoelectric element 30 operate as the acoustic device 100 which outputs air-conduction sound and vibration sound.

Figure 4:
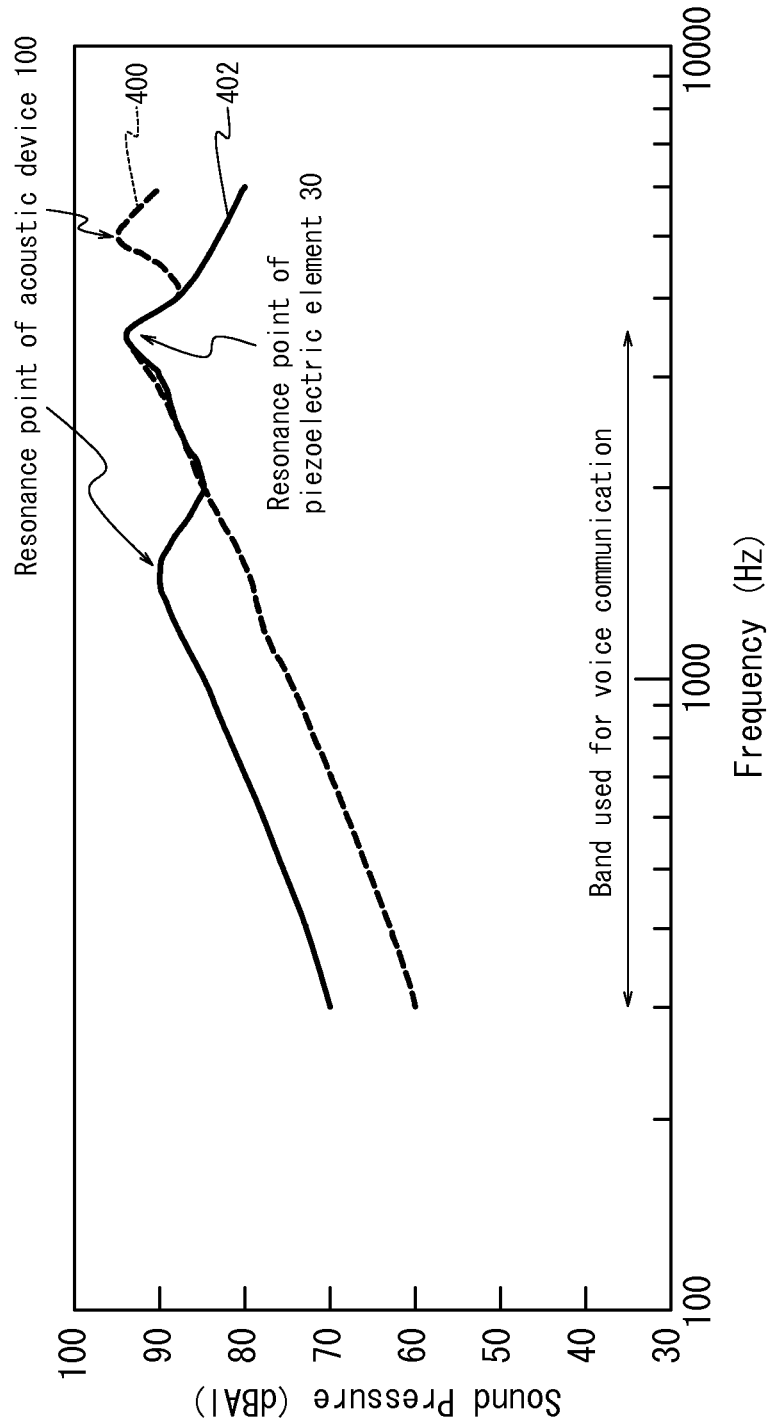
FIG. 4 illustrates a frequency characteristic of an acoustic device.

FIG. 4 illustrates the frequency characteristic of the acoustic device 100 included in the electronic device 1 according to the first embodiment. In FIG. 4, there are illustrated a frequency characteristic 400 when the acoustic device 100 is configured by the panel 10 and the piezoelectric element 30, and a frequency characteristic 402 when the display unit 20 as the vibration adjusting unit is adhered to the panel 10 as described above. A horizontal axis represents frequency, and a vertical axis represents sound pressure. A resonance point of the acoustic device 100 when the display unit 20 is not adhered is approximately 5 kHz. On the other hand, the resonance point of the acoustic device 100 when the display unit 20 is adhered is approximately 1.5 kHz. Note that in either case the resonance point of the piezoelectric element 30 itself is approximately 3.5 kHz. As illustrated in FIG. 4, the resonance point of the acoustic device 100 in which the display unit 20 is adhered as the vibration adjusting unit is in a lower frequency range compared to when the display unit 20 is not adhered to the panel 10. On the other hand, a frequency band used in sound and voice communication on a mobile phone is from 400 Hz to 3.4 kHz. Accordingly, although the resonance point when the display unit 20 as the vibration adjusting unit is not employed is near a boundary of the frequency band to be used, the resonance point of the acoustic device 100 when the vibration adjusting unit is employed may be set within the frequency band to be used.

As described above, according to the electronic device 1 of the present embodiment, the panel 10 is deformed due to deformation of the piezoelectric element 30 attached to the back surface of the panel 10 via the joining member 70, and air-conduction sound and vibration sound are transmitted to an object that is in contact with the deformed panel 10. As a result, air-conduction sound and vibration sound are transmitted to the user without having to protrude the vibration body from the outer surface of the housing 60. Furthermore, by joining the piezoelectric element 30, the resonance frequency of the acoustic device 100 may be varied so as to adjust the frequency characteristic. Moreover, by joining, in addition to the piezoelectric element 30, the display unit 20 to the panel 10 by the joining member 70, the resonance frequency of the acoustic device 100 may be further varied so as to adjust the frequency characteristic. For example, compared to the case of the panel 10 alone, the resonance band of the acoustic device 100 may be included in the band (e.g. of from 300 Hz to 3.4 kHz) used for voice communication, and the frequency characteristic in the band used for voice communication is improved.

Sound pressure levels at different frequencies in the frequency band used in general become higher when the vibration adjusting unit is used than when the panel 10 is solely used. That is to say, a signal level to be applied to the piezoelectric element 30 for achieving a desired sound pressure level in case of the vibration adjusting unit being used is lowered than that in case of the panel 10 being solely used, and thus the need for amplifying the signal is reduced. As a result, an advantageous effect of reducing a scale and power consumption of the amplifier is achieved.

The deformation is caused in the area of the panel 10 where the piezoelectric element 30 is disposed and in other areas of the panel 10, for transmission of air-conduction sound and vibration sound. Accordingly, the user is able to hear air-conduction sound transmitted through air and to hear vibration sound by placing the ear in contact with any position of the panel 10.

The joining member 70 may be the adhesive agent that is not thermosetting. The above structure provides an advantage that contraction due to a thermal stress is less likely to occur during curing between the piezoelectric element 30 and the panel 10. The joining member 70 may be the double-sided adhesive tape. The above structure provides an advantage that a contraction stress, which often occurs when the adhesive agent is used, is less likely to be applied between the piezoelectric element 30 and the panel 10.

Figure 5:
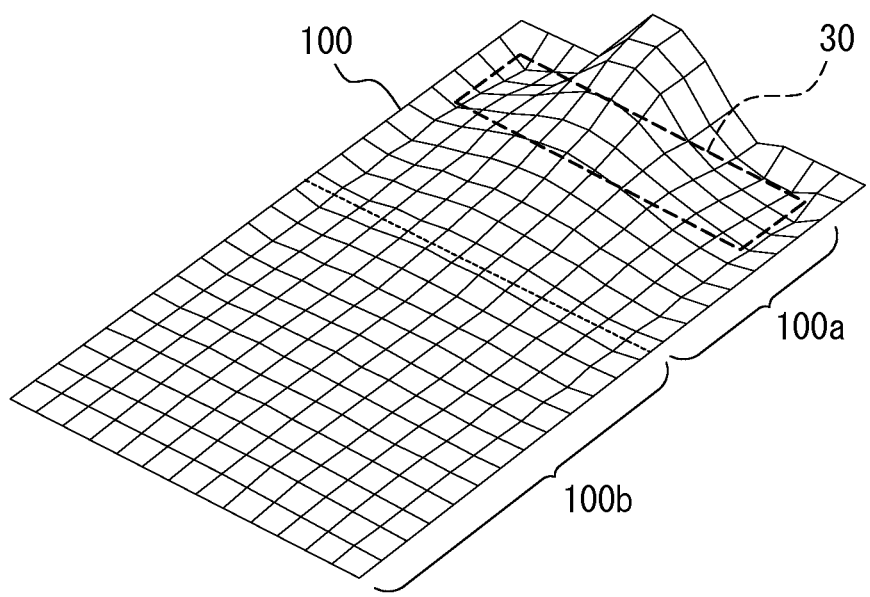
FIG. 5 illustrates one example of a vibration of a panel of an acoustic device.
Figure 6:
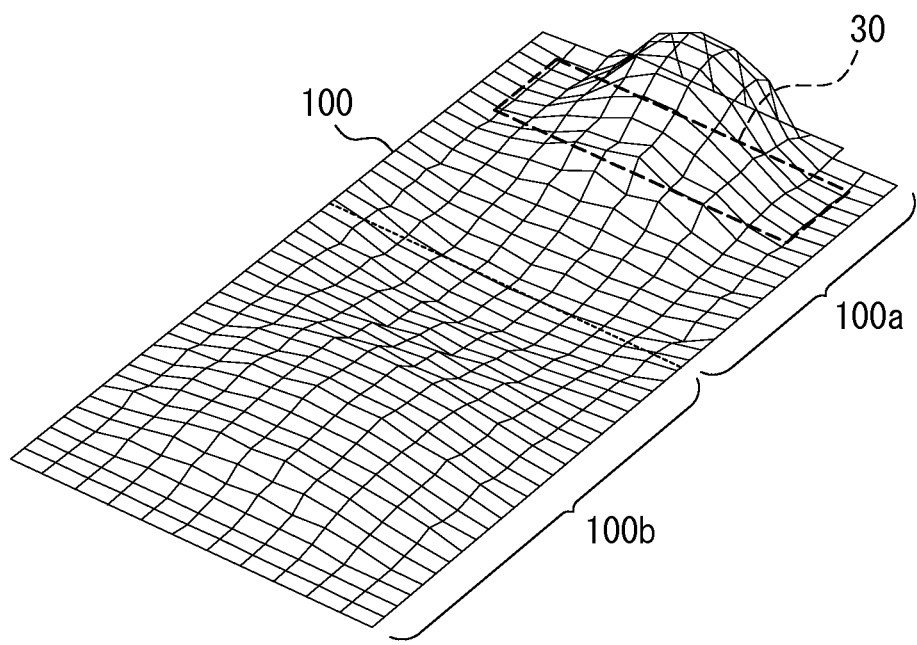
FIG. 6 illustrates one example of a vibration of an acoustic device.

FIG. 5 illustrates one example of the vibration of the acoustic device 100 included in the electronic device 1 according to the first embodiment. On the other hand, FIG. 6 illustrates one example of the vibration of the acoustic device 100 in which the display unit 20 is not adhered to the back surface of the panel 10. The panel 10 in the upper portion thereof is bent directly by the piezoelectric element 30, and the vibration in the lower portion is attenuated compared to the vibration in the upper portion. The panel 10 is bent by the piezoelectric element 30 such that a portion of the panel 10 directly above the piezoelectric element 30 protrudes relative to neighboring portions of the panel 10 in a long side direction of the piezoelectric element 30. In the electronic device 1 according to the first embodiment, the display unit 20 is attached to the panel 10. Consequently, rigidity of the acoustic device 100 is higher in a lower portion 100b thereof than in an upper portion 100a thereof. The above structure makes it possible to cause a larger vibration in the upper portion 100a of the acoustic device 100 that is attached with the piezoelectric element 30 than in the lower portion 100b of the acoustic device 100, compared to the case of FIG. 5 not having the display unit 20. In other words, the lower 100b of the acoustic device 100 undergoes less vibration than the upper 100a of the acoustic device 100 that is attached with the piezoelectric element 30. As a result, sound leakage resulting from the vibration in the lower portion of the panel 10 that is not in contact with the user's ear is reduced. For example, when the panel 10 has the rectangular shape, the panel 10 tends to be bent in the longitudinal direction thereof, and the vibration is difficult to attenuate. However, by increasing rigidity of the acoustic device 100 as a whole by adhesion of the display unit 20, attenuation of the vibration is increased, and the vibration in the lower portion of the acoustic device 100 may be reduced.

Note that a width of an area which includes a joining portion for joining the piezoelectric element and to which the display unit 20 is not joined ranges from 0.5 cm to 5 cm in a first direction from the area's joining portion for the piezoelectric element 30 to an area in which the display unit 20 is joined. With the above structure, it is ensured that the area not to reduce the vibration has a sufficient size and that the electronic device is not oversized in a plane-view direction.

As described above, according to the electronic device 1 of the present embodiment, the panel 10 is deformed due to deformation of the piezoelectric element 30 attached to the back surface of the panel 10, and air-conduction sound and vibration sound are transmitted to an object that is in contact with the deformed panel 10. As a result, air-conduction sound and vibration sound are transmitted to the user without having to protrude the vibration body from an outer surface of the housing 60. Accordingly, usability of the electronic device is improved compared to such an electronic device as described in Patent Literature 1 (Japanese Patent Application Publication No. 2005-348193), by which the user places the vibration body, which is significantly small compared to the housing, in contact with the body. Furthermore, since there is no need for pressing the user's ear to the piezoelectric element itself, the piezoelectric element 30 itself is less likely to be damaged. Moreover, although in a case where not the panel 10 but the housing 60 is deformed the user tends to drop a terminal device while the vibration is generated, such dropping is less likely to occur in the case where the panel 10 is vibrated.

The piezoelectric element 30 is joined to the panel 10 by the joining member 70. The above structure allows attachment of the piezoelectric element 30 to the panel 10 in a manner such that flexibility of deformation of the piezoelectric element 30 is less likely to be limited. The joining member 70 may be the adhesive agent that is not thermosetting. The above structure provides an advantage that contraction due to a thermal stress is less likely to occur during curing between the piezoelectric element 30 and the panel 10. The joining member 70 may be the double-sided adhesive tape. The above structure provides an advantage that a contraction stress, which often occurs when the adhesive agent is used, is less likely to be applied between the piezoelectric element 30 and the panel 10.

<Second Embodiment>

Figure 7A:
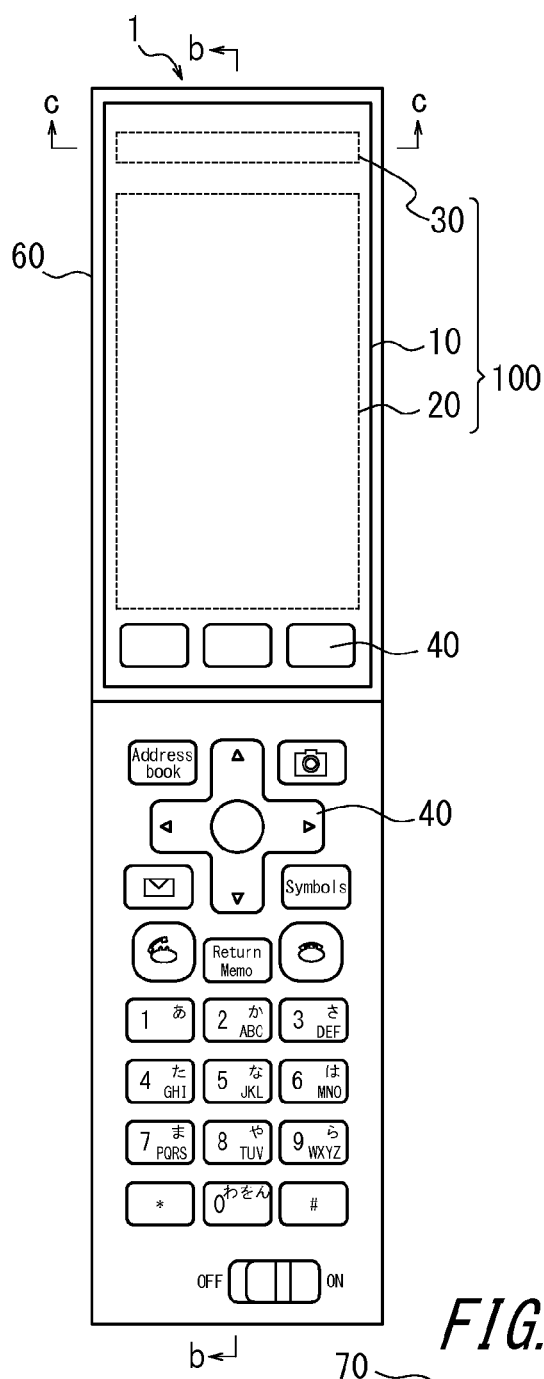
FIGS. 7A and 7B illustrate a housing structure of an electronic device according to yet another embodiment.
Figure 7B:
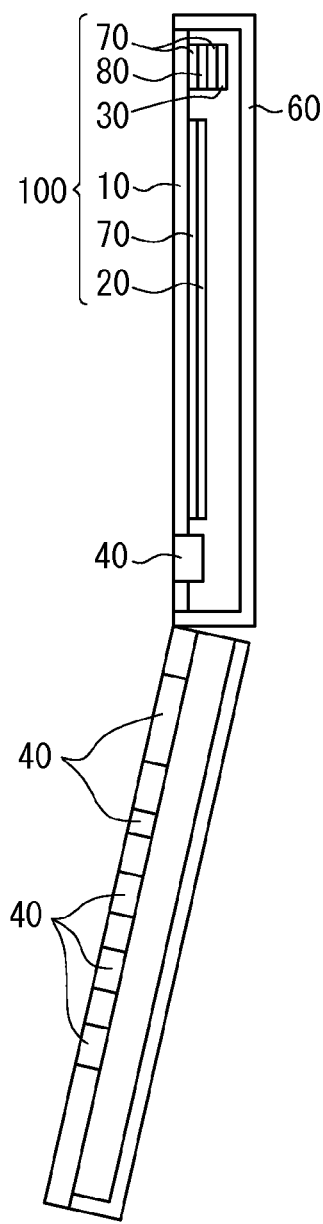
Figure 7C:
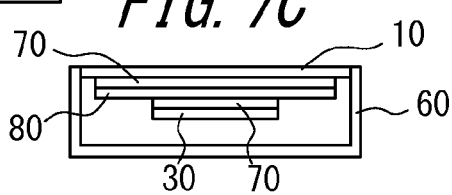

FIGS. 7A and 7B illustrate the housing structure of the electronic device 1 according to a second embodiment. FIG. 7A is a front view, FIG. 7B is a sectional view taken along a line b-b of FIG. 7A, and FIG. 7C is a sectional view taken along a line c-c of FIG. 7A. The electronic device 1 illustrated in FIGS. 7A and 7B is a foldable mobile phone in which the acoustic device 100, which includes the display unit 20 and a cover panel (e.g. an acrylic plate) serving as the panel 10 and configured to protect the display unit 20, is provided on a front surface of an upper portion of the housing 60. The display unit 20 is joined to the panel 10 by the joining member 70. In the second embodiment, the reinforcing member 80 is disposed between the panel 10 and the piezoelectric element 30. The reinforcing member 80 may be a resin plate, a metal plate, or a resin plate including glass fiber. That is to say, the electronic device 1 according to the second embodiment has a structure where the piezoelectric element 30 and the reinforcing member 80 are adhered by the joining member 70, and the reinforcing member 80 and the panel 10 are adhered by the joining member 70.

As described above, according to the electronic device 1 of the present embodiment, the reinforcing member 80 and the panel 10 are deformed due to deformation of the piezoelectric element 30 attached to the panel 10 via the reinforcing member 80, and air-conduction sound and vibration sound are transmitted to an object that is in contact with the deformed panel 10. Accordingly, air-conduction sound and vibration sound are transmitted to the user without the need for pressing the vibration body itself to the ear. Furthermore, the piezoelectric element 30 is attached to the surface of the inner side of the housing 60 of the panel 10. As a result, air-conduction sound and vibration sound are transmitted to the user without having to protrude the vibration body from the outer surface of the housing 60. Moreover, the deformation is caused in the area of the panel 10, where the piezoelectric element 30 is disposed and in other areas of the panel 10, for transmission of air-conduction sound and vibration sound. Accordingly, the user is able to hear air-conduction sound transmitted through air and to hear vibration sound by placing the ear in contact with any position of the panel 10.

Furthermore, by disposing the reinforcing member 80 between the piezoelectric element 30 and the panel 10, when the panel 10 is applied with an external force, the applied external force is less likely to be transferred to the piezoelectric element 30 and damage the piezoelectric element 30. Even when the panel 10 is forcefully pressed against the human body, the attenuation in the vibration of the panel 10 is reduced. Moreover, owing to the reinforcing member 80 disposed between the piezoelectric element 30 and the panel 10, a resonance frequency of the panel 10 is lowered, and an acoustic characteristic in a low frequency band is improved. Note that instead of the reinforcing member 80 a plate-shaped weight may be attached to the piezoelectric element 30 by the joining member 70.

Although the present invention has been described based on the drawings and the embodiments thereof, it should be noted that a person skilled in the art may easily make a variety of modifications and alterations according to the present disclosure. Note that the modifications and alterations are within the scope of the present invention. For example, functions and the like included in the components and steps may be rearranged as long as the functions and the like are logically consistent. A plurality of component parts, the steps, and the like may also be integrated or separated.

For example, as illustrated in FIG. 8, the panel 10 may be configured to be joined to the housing 60 by the joining member 70. By thus preventing the vibration of the panel 10 from being transmitted directly to the housing 60, the risk that the user drops the electronic device 1 is reduced compared to the case where the housing itself undergoes a large vibration. The joining member 70 may be the adhesive agent that is not thermosetting. The above structure provides an advantage that contraction due to a thermal stress is less likely to occur during curing between the housing 60 and the panel 10. The joining member 70 may be the double-sided adhesive tape. The above structure provides an advantage that a contraction stress, which often occurs when the adhesive agent is used, is less likely to be generated between the housing 60 and the panel 10.

When the panel 10 and the display unit 20 are not superposed, for example, the piezoelectric element 30 may be disposed in the middle of the panel 10. When the piezoelectric element 30 is disposed in the middle of the panel 10, the vibration of the piezoelectric element 30 is evenly transmitted to the whole panel 10, thereby improving a quality of air-conduction sound and allowing the user to perceive vibration sound even when the user places the ear in contact with the panel 10 at different positions of the panel 10. Note that, similarly to the first embodiment, the piezoelectric element 30 may be provided in plurality.

Although in the above electronic device 1 the piezoelectric element 30 is adhered to the panel 10, the piezoelectric element 30 may be attached to another place than the panel 10. For example, the piezoelectric element 30 may be adhered to a battery lid that is configured to be attached to the housing 60 to cover a battery. Since the battery lid is often attached to a surface different from the panel 10 in the electronic device 1 such as the mobile phone, the above structure enables the user to listen to sound by placing a portion of the body (e.g. the ear) in contact with the surface different from the panel 10.

The panel 10 may form a part or an entirety of any of a display panel, an operation panel, the cover panel, and a lid panel that allows a rechargeable battery to be detachable. Preferably, when the panel 10 is the display panel, the piezoelectric element 30 is disposed outside of a display area provided for a display function. The above structure provides an advantage that display is less likely to be disturbed. The operation panel includes the touch panel of the first embodiment. The operation panel may also include a sheet key, namely, a component of the foldable mobile phone or the like that is integrally provided with a key top as the operation key and that forms one surface of the housing on an operational side.

Meanwhile, in the first embodiment and the second embodiment, the joining member used for adhering the panel 10 and the piezoelectric element 30, the joining member used for adhering the panel 10 and the housing 60, and the like are denoted by the same reference numeral as the joining member 70. However, the joining members used in the first embodiment and the second embodiment may be different depending on the components to be joined, as appropriate.

Although the above embodiments illustrate the display unit serving as the vibration adjusting unit configured to be joined to the panel provided with the piezoelectric element, the present invention is not limited to these embodiments. For example, the vibration adjusting unit may be other than the display unit. The vibration adjusting unit may be a touch panel having a touch function, a circuit substrate, or simply, a glass plate, an acrylic panel, a metal plate, or the like, which only need to be adhered to the panel by the double-sided adhesive tape or the like.

REFERENCE SIGNS 1 electronic device
10 panel
20 display unit
30 piezoelectric element
40 input unit
50 control unit
60 housing
70 joining member
80 reinforcing member
90 support portion
100 acoustic device

The invention claimed is:

1. An electronic device comprising:
a housing; and
an acoustic device configured to generate vibration sound that is transmitted by vibrating a part of a human body, wherein
the acoustic device includes:
a panel configured to be joined to the housing;
a piezoelectric element configured to be joined to the panel for vibrating the panel; and
a vibration adjusting unit configured to be joined to the panel and vibrated together with the panel by the piezoelectric element, and wherein
the acoustic device transmits sound by bending the panel with the piezoelectric element such that a portion of the panel directly above the piezoelectric element protrudes relative to neighboring portions of the panel in a long side direction of the piezoelectric element and by vibrating a contacting part of a human body that is in contact with the bent panel, and the acoustic device has a resonance frequency within a frequency range used for a sound function, and wherein
the vibration occurs in an area of the panel that is larger than an area having a length corresponding to a distance from an inferior crus of antihelix to an antitragus and a width corresponding to a distance from a tragus to an antihelix of an ear of the human body.

2. The electronic device of claim 1, wherein
the vibration adjusting unit comprises a display unit configured to display predetermined information.

3. The electronic device of claim 1, wherein
the panel has a resonance frequency within a range outside the-frequency range used.

4. The electronic device of claim 1, wherein
the piezoelectric element has a resonance frequency within a range outside the frequency range used.

5. The electronic device of claim 1, further comprising:
a voice communication function, wherein
the acoustic device is configured to generate air-conduction sound and vibration sound that correspond to sound in voice communication, and
the frequency range used is from 0.4 kHz to 3.4 kHz.

6. The electronic device of claim 1, further comprising:
an amplifier configured to amplify a signal applied to the piezoelectric element.

7. The electronic device of claim 1, wherein
a length of the panel in a direction extending from a joining portion of the piezoelectric element to a joining portion of the vibration adjusting unit is greater than or equal to a length from the antitragus to the inferior crus of antihelix.

8. The electronic device of claim 1, wherein
a length of the panel in a direction intersecting with the direction extending from the joining portion of the piezoelectric element to the joining portion of the vibration adjusting unit is greater than or equal to a length from the tragus to the antihelix.

9. The electronic device of claim 1, wherein
the piezoelectric element is joined to the panel by a joining member.

10. The electronic device of claim 9, wherein the joining member comprises a non-thermosetting adhesive agent.

11. The electronic device of claim 9, wherein
the joining member comprises a double-sided adhesive tape.

12. The electronic device of claim 1, wherein
the panel is joined to the housing by a joining member.

13. The electronic device of claim 12, wherein
the joining member comprises a non-thermosetting adhesive agent.

14. The electronic device of claim 12, wherein
the joining member comprises a double-sided adhesive tape.

15. The electronic device of claim 1, wherein
the panel forms a part or an entirety of any of a display unit, an input unit, a cover of the display unit, and a lid portion that allows a battery to be detachable.

16. The electronic device of claim 2, wherein
a joining portion of the piezoelectric element in the panel is located outside of an overlapping area between the panel and the vibration adjusting unit.

17. The electronic device of claim 1, wherein the panel is larger than an ear.

18. The electronic device of claim 1, wherein the panel comprises a panel for display.

19. The electronic device of claim 18, wherein the piezoelectric element is disposed outside of a display area provided for a display function.

20. An electronic device comprising:
a housing; and
an acoustic device configured to generate vibration sound that is transmitted by vibrating a part of a human body, wherein
the acoustic device includes:
a panel configured to be joined to the housing;
a piezoelectric element configured to be joined to the panel for vibrating the panel; and
a vibration adjusting unit configured to be joined to the panel and vibrated together with the panel by the piezoelectric element, and wherein
the acoustic device transmits sound by bending the panel with the piezoelectric element such that a portion of the panel directly above the piezoelectric element protrudes relative to neighboring portions of the panel in a long side direction of the piezoelectric element and by vibrating a pressed part of a human body that is pressed against the bent panel, and the acoustic device has a resonance frequency within a frequency range used for a sound function, and wherein the vibration occurs in an area of the panel that is larger than an area having length corresponding to a distance from an inferior crus of antihelix to an antitragus and a width corresponding to a distance from a tragus to an antihelix of an ear of the human body.

21. The electronic device of claim 20, wherein, when pressed with force greater than or equal to 3 N, the pressed part is vibrated, and sound is transmitted.

22. The electronic device of claim 20, wherein, when pressed with force greater than or equal to 5 N, the pressed part is vibrated, and sound is transmitted.

23. The electronic device of claim 20, wherein, when pressed with force less than or equal to 10 N, the pressed part is vibrated, and sound is transmitted.

\* \* \* \* \*